United States Patent Office 3,234,222
Patented Feb. 8, 1966

3,234,222
PREPARATION OF 7-ACYLAMINO-CEPHALOSPORANIC ACIDS
Bruno Fechtig and Hans Bickel, Binningen, Ernst Vischer, Basel, Albert Eschenmoser, Zollikon, Zurich, and Jakob Schreiber, Zurich, Switzerland, assignors to Ciba Corporation, New York, N.Y., a corporation of Delaware
No Drawing. Filed Feb. 13, 1963, Ser. No. 258,143
Claims priority, application Switzerland, Feb. 16, 1962, 1,908/62
6 Claims. (Cl. 260—243)

The present invention provides a new process for the manufacture of N-substituted carboxylic acid amides, more especially of Cephalosporins.

According to the new process imino ethers of Cephalosporins obtainable by fermentation or of functional derivatives thereof, more especially of Cephalosporin C or its derivatives, are acylated with carboxylic acid halides or anhydrides and the reaction product is hydrolysed. The free amino group of the side-chain is protected during the reaction, for example by a lower alkyl, aryl or acyl radical, preferably by a radical which diminishes the basicity of the amino group. An aryl radical is, for example, a naphthyl or phenyl radical which is unsubstituted or substituted by a nitro, cyano or sulphoxyl group, a halogen atom, a carbonamido, carbo-lower alkyl or carbo-lower alkoxy group, such as the 2:4-dinitrophenyl, 2:4:6-trinitrophenyl, 2:4-dinitro-6-methoxyphenyl, 4-cyanophenyl or 4-carbomethoxyphenyl radical. An acyl radical is more especially a lower alkanoyl radical, for example acetyl, propionyl, butyryl, also an aroyl radical such as benzoyl or benzoyl substituted by a nitro, cyano, sulphoxyl group, a halogen atom, a lower alkyl or lower alkoxy group; also an aryl lower alkoyl radical, for example phenylacetyl; the carbobenzoxy and tertiary butyloxycarbonyl radical; the benzene sulfonyl and toluenesulfonyl radical. The carboxyl groups may also be protected, for example by esterification, more especially with alcohols or phenols that are easy to hydrolyze under alkaline conditions, for example alcohols or phenols containing electron-attracting substituents such as the nitro, cyano or sulfoxy or esterified carboxyl groups, such as cyanomethyl alcohol or para-nitrophenol; furthermore, the esterification may advantageously be carried out with alcohols capable of hydrogenolytic elimination, for example a benzyl alcohol. Starting for instance from acid halides and Cephalosporin C-imino ether the reaction may be represented as follows:

in which Z represents an amino protective group, and $R_1$ represents an alkyl or aralkyl radical, more especially a lower alkyl group such as methyl, ethyl or propyl, or benzyl.

$R_2$—CO— may be any desired acyl group to be introduced at the 7-amino group, being above all a radical of an aliphatic, cycloaliphatic, araliphatic, aromatic or heterocyclic carboxylic acid. The acyl group is, for example: 2:6 - dimethoxy - benzoyl, 2 - carboxy - benzoyl, 2-(2' - carboxyphenyl) - benzoyl, 5 - methyl - 3 - phenyl - 4 - isoxazolyl - carbonyl, phenylacetyl, para - aminophenylacetyl, $\alpha$ - phenyl - glycyl, $\beta$ - phenyl - alanyl, $\alpha$-halogenyl - $\alpha$ - phenyl - acetyl, $\alpha$ - phenoxy - $\alpha$ - phenylacetyl, phenoxy - acetyl, $\alpha$ - phenoxy - propionyl, m-chlorophenoxy - acetyl, $\alpha$ - phenoxy - butyryl, $\alpha$ - alkyl-$\alpha$ - phenoxy - acetyl, $\alpha$ - (para - nitrophenoxy) - propionyl, $\alpha$ - phenoxy - $\alpha$ - halogeno - acetyl, 2:4 - dichlorophenylmercapto - acetyl, $\beta$-benzyl - mercapto - propionyl, phenylmercapto - acetyl, 3 - chlorophenyl - mercapto - acetyl 4 - chlorophenyl - mercapto - acetyl, 2 - methoxy - 5-methyl - phenyl - mercapto - acetyl, 2:4 - dichlorophenyl - mercapto - acetyl, $\beta$ - benzyl - mercapto - propionyl, 2:4 - dimethoxy - 3 - quinoloyl, $\alpha$:$\alpha$ - diphenyl-$\alpha$ - methallyl - acetyl, 4:6 - dimethyl - 2 - chloro - nicotinoyl, 2 - methoxy - 4:6 - dimethyl - nicotinoyl, 2:6-dimethoxy - 4 - phenyl - nicotinoyl, 2:4:6 - trimethoxy-nicotinoyl, 2:4 - dimethoxy - nicotinoyl, 2:4:6 - trichloro - nicotinoyl, 2 - methoxy - 5 - methyl - phenyl - mercapto - acetyl or 2 -methoxy - naphthalene - 1 - carbonyl, 2 - ethoxy - naphthalene - 1 - carbonyl, thiophene - 2-acetyl.

The acylation is performed in the usual manner by means of the acid halides or anhydrides, advantageously in the presence of diluents such as halogenated hydrocarbons, for example methylene chloride, ethylene chloride or chloroform, acetonitrile, ether, dioxane, tetrahydrofuran or the like, and of basic condensing agents such, for example as carbonates or bicarbonates of alkali metals, advantageously organic bases such as tertiary amines, for example trialkylamines, pyridine, picoline, collidine, lutidine, dimethylaniline or the like. The hydrolysis is likewise performed in known manner, under alkaline or acidic conditions, for example by means of hydroxides, carbonates or bicarbonates of alkali metals, or acids such as, for example dilute hydrochloric or sulfuric acid or phosphoric acid or strong organic acids, such as trifluoracetic acid, benzene sulfonic acid, para-toluenesulfonic acid.

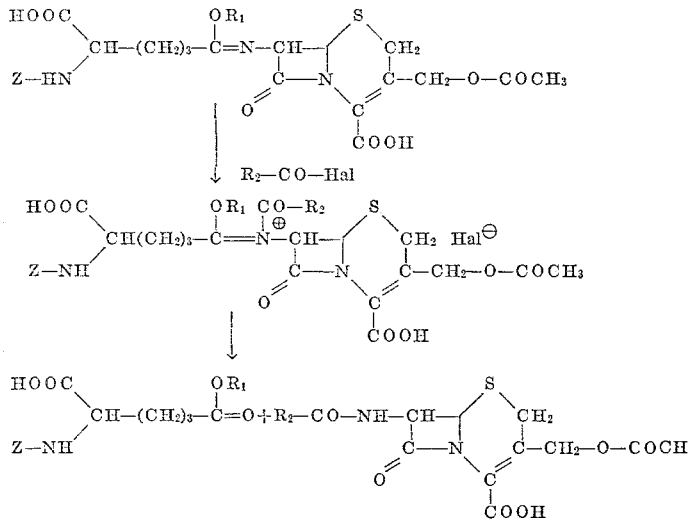

The imino ethers used as starting material may be prepared, for example, with the use of the trialkyl oxonium fluoborates, more especially tri-lower alkyl oxonium fluoborates.

The imino ethers need not be isolated but may be formed in the course of the reaction and used as they are obtained. Likewise the anhydrides used as acylation agents may be formed in the course of the reaction, for example by reacting the starting material with the free acid in the presence of a carbodiimide.

The invention includes also any variant of the present process in which an intermediate obtained at any stage of the process is used as starting material and any remaining steps are carried out, or the process is discontinued at any stage thereof.

The following examples illustrate the invention.

EXAMPLE 1

A solution of 2.9 grams ($5.10^{-3}$ mols) of N-2:4-dinitrophenyl-Cepalosporin C in 40 ml. of dioxane is mixed with 50 ml. of ethylene chloride and then at 0° C. with 9.5 ml. of a solution of 10% strength of triethyl oxonium fluoborate in ethylene chloride ($5.10^{-3}$ mols) and kept for 2 hours at 0° C. and then for 4 hours at 22° C. in the dark. At 0° C. there are then added 10.6 grams ($10.5.10^{-3}$ mols) of triethylamine and 8.5 grams ($5.5.10^{-3}$ mols) of phenylacetyl chloride and the mixture is kept for 17 hours at 20° C. and then considerably concentrated under a vacuum of 0.1 mm. Hg. The residue is dissolved in 70 ml. of methanol, the reaction product is hydrolyzed by adding 15 ml. of N-hydrochloric acid and the whole is kept for 2 hours at 20° C. The solution is then diluted with 50 ml. of water, adjusted with 2N-sodium carbonate solution to pH=7.0 and freed under vacuum from the organic solvent. The aqueous phase is exhaustively washed with ethyl acetate, then adjusted with phosphoric acid to 80% strength to pH=2.5, and the product is extracted with ethyl acetate. The extract is washed with a small amount of water, dried over sodium sulfate and evaporated, to yield crude 7-(phenylacetylamino)-cephalsporanic acid which is purified by a Craig distribution as described below:

In a first system of n-butylacetate+aqueous acetic acid of 1% strength, 10 ml. each per upper and bottom phase, and with a distribution over 21 stages the microbiologically active material (towards Staphylococcus aureus) of fractions 16 to 21 is combined and evaporated and then distributed in a second system (n-butanol:0.05-molar sodium phosphate buffer pH=6.0) over 21 stages. Fractions 6 to 10 are combined, freed under vacuum from butanol, diluted with water and extracted with ethyl acetate at pH=2.5. The extract is dried and evaporated, to yield 7-(phenylacetylamino)-cephalosporanic acid having the following properties:

Paper-chromatography $R_f$-value=0.79 in the system n-butanol:glacial acetic acid (10:1) saturated with water, bioautographic development with Staphylococcus aureus.

High-voltage paper-electrophoresis 2000 volts, 1 hour, N-acetic acid adjusted with pyridine to pH=4.5.

Distance travelled: 3.2 cm. towards the anode (Cephalosporin C: 3.6 cm.)

Ultra-violet spectrum in alcohol $\lambda_{max}$ 259 m$\mu$ $E_{1\ cm.}^{1\%}$ 180

Plate test

Inhibition zones of a 0.1% solution on 6 cm. paper roundels:

| | Mm. |
|---|---|
| Staphylococcus aureus | 25 |
| Staphylococcus aureus (penicillin resistant) | 19 |
| Bacillus subtilis | 37 |

EXAMPLE 2

762 mg. ($10^{-3}$ mols) of N-2:4-dinitro-phenyl-Cephalosporin C dibenzyl ester are dissolved in 30 ml. of ethylene chloride, treated with 1.9 ml. ($10^{-3}$ mols) of triethyl oxonium fluoborate of 10% strength in ethylene chloride and allowed to stand for 4 hours at 20° C. 5 ml. of pyridine and 0.23 ml. (about $1.5.10^{-3}$ mols) of phenylacetyl chloride are then added at 0° C. and the whole allowed to stand for 15 hours at 20° C. The reaction mixture is evaporated under 0.1 mm. pressure of mercury, the residue taken up in 75 ml. of dioxane and 45 ml. of 5% aqueous phosphoric acid and hydrolyzed for 8 hours at 22° C. After dilution with water, evaporation of the dioxane in vacuo and extraction with a mixture of chloroform and ether (1:3), an extract is obtained which is washed with phosphoric acid of 2% strength, N-sodium bicarbonate and water until the washings run neutral, dried over sodium sulfate and then evaporated. The residue consists of 7-phenylacetylamino-cephalosporanic acid benzyl ester. Thin layer chromatogram on silica gel in the system benzene:acetone (8:2): $Rf=0.53$; system benzene:methanol (95:5): $Rf=0.50$ (development according to R. Thomas, Nature 191, 1161 (1961) with iodized starch as reagent). Paper chromatogram in the system cyclohexane:benzene (1:1) saturated with formamide, bioautographical development with Staphylococcus aureus $Rf=0.49$.

7-phenylacetylamino-cephalosporanic acid benzyl ester is hydrogenated in glacial acetic acid solution and in the presence of palladium carbon to form 7-phenylacetylamino-cephalosporanic acid. Paper chromatogram in the system n-butanol:ethanol:water (4:1:5): $Rf=0.56$.

What is claimed is:

1. A process for the manufacture of a 7-acylamino-cephalosporanic acid of the Formula I

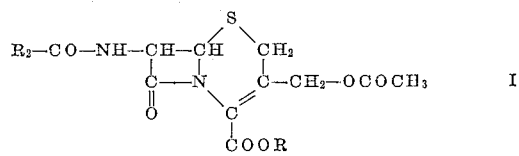

in which OR stands for a member selected from the group consisting of the hydroxy group and an easily hydrolyzable alcoholic ester protective group and CO—$R_2$ for an acyl radical derived from a carboxylic acid, wherein a member selected from the group consisting of a lower alkyl imidoester of Cephalosporin C and its diester of the Formula II

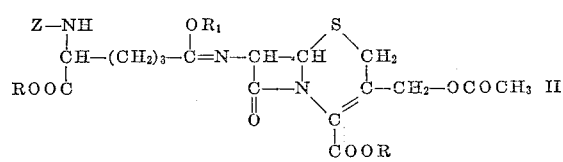

in which $R_1$ stand for lower alkyl, Z for a blocking agent selected from the group consisting of lower alkyl, aryl and acyl, and OR and CO—$R_2$ have the meaning given above, is reacted with a member selected from the group consisting of a carboxylic acid halide and a carboxylic acid anhydride, and the resulting quaternary ammonium compound treated with a hydrolyzing agent selected from the group consisting of an aqueous acidic and an aqueous alkaline agent.

2. A process as claimed in claim 1, wherein the product of Formula I, the alcoholic ester group OR is split off by hydrolysis in an alkaline medium.

3. A process as claimed in claim 1, wherein any carboxyl group present in the starting material is esterified with a carboxylic acid.

4. A process as claimed in claim 1, wherein the imino ether is prepared by reacting a cephalosporin with a tri-lower alkyl oxonium fluoborate, and acylated with a carboxylic acid acylating agent.

5. A process as claimed in claim 1, wherein the acylation is carried out with a carboxylic acid chloride.

6. A process for the manufacture of a 7-acylaminocephalosporanic acid of the Formula I

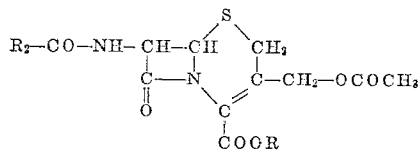

in which OR stands for a member selected from the group consisting of the hydroxy group and an alcoholic ester protective group, easily split off by hydrogenolysis and CO—$R_2$ for an acyl radical derived from a carboxylic acid, wherein a member selected from the group consisting of a lower alkyl imidoester of Cephalosporin C and its diester of the Formula II

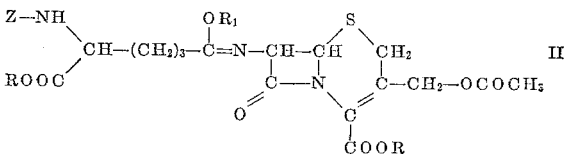

in which $R_1$ stand for lower alkyl, Z for a blocking agent selected from the group consisting of lower alkyl, aryl and acyl, and OR and CO—$R_2$ have the meaning given above, is reacted with a member selected from the group consisting of a carboxylic acid halide and a carboxylic acid anhydride, and the resulting quaternary ammonium compound treated with a hydrogenolytic agent.

References Cited by the Examiner

UNITED STATES PATENTS 3,049,541  8/1962  Abraham et al. _____ 260—243
3,124,576  3/1964  Stedman _____ 260—243

OTHER REFERENCES

Biochemical Journal, vol. 81, pages 591–596 (1961).

NICHOLAS S. RIZZO, *Primary Examiner.*